United States Patent
Kuciera et al.

(10) Patent No.: US 9,280,228 B1
(45) Date of Patent: Mar. 8, 2016

(54) PATIENT-ACTUATED CONTROL DEVICE FOR CONTROLLING AN AUDIO-VISUAL DISPLAY AND ANCILLARY FUNCTIONS IN A HOSPITAL ROOM

(71) Applicant: Anacom Medtek, Anaheim, CA (US)

(72) Inventors: Joachim Kuciera, Placentia, CA (US); Paul Lau, Anaheim, CA (US); Daniel Scott Haines, Orange, CA (US)

(73) Assignee: ANACOM MEDTEK, Anaheim, CA (US)

( * ) Notice: Subject to any disclaimer, the term of this patent is extended or adjusted under 35 U.S.C. 154(b) by 72 days.

(21) Appl. No.: 14/458,886

(22) Filed: Aug. 13, 2014

(51) Int. Cl.
  *G06F 3/041* (2006.01)
  *G08C 19/16* (2006.01)

(52) U.S. Cl.
  CPC ............ *G06F 3/041* (2013.01); *G08C 19/16* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 7,142,256 B2* | 11/2006 | Stoner | ................ | H03J 1/0025 340/12.22 |
| 7,495,659 B2* | 2/2009 | Marriott | ............ | G06F 3/03547 178/18.01 |
| 2013/0229583 A1* | 9/2013 | Kuciera | ............ | H04N 21/2143 348/734 |

* cited by examiner

*Primary Examiner* — Van Chow
(74) *Attorney, Agent, or Firm* — Klein, O'Neill & Singh, LLP (57) ABSTRACT

A hand-held control device includes a housing including first and second housing pieces and a touch pad attached to an exterior surface of the first housing piece. The second housing piece defines a coupler well containing an electrical header. A speaker retention structure on an interior surface of the second housing piece includes an annular wall extending from an interior surface of the first housing piece and including a plurality of gaps at spaced intervals, and a resilient speaker retention finger extending from the interior surface of the first housing piece in each of the gaps. A cable connector assembly includes a coupler containing a socket, and a control cable electrically connected to the socket within the coupler. The coupler is sized and shaped to fill a coupler well in the housing so that the socket is connectable to the electrical header in the coupler well.

8 Claims, 6 Drawing Sheets

PATIENT-ACTUATED CONTROL DEVICE FOR CONTROLLING AN AUDIO-VISUAL DISPLAY AND ANCILLARY FUNCTIONS IN A HOSPITAL ROOM

CROSS-REFERENCE TO RELATED APPLICATION

Not applicable.

BACKGROUND

This disclosure relates to systems and devices for controlling a hospital patient room environment, including audiovisual (A-V) displays (e.g., televisions and video monitors) and ancillary environmental features (e.g., lights, window shades, room temperature). In a particular embodiment, this disclosure relates to systems employing control devices embodied in or configured as pillow speakers with touch-panel controls, among which are A-V display controls, environmental controls, and a nurse call actuator.

A-V displays, such as televisions, are often used as "infotainment" displays in institutions, particularly in individual rooms of healthcare facilities, such as hospitals, hospices, and nursing homes. Data capabilities, including interactive functions, are frequently added to the displays. A user commonly controls an infotainment display in, for example, a hospital, using a device termed a "pillow speaker," which includes sound reproduction and control abilities. The control abilities may include powering the display on and off, changing channel and volume, and, for data-capabilities, entering interactive information. Such pillow speakers typically include a nurse (or attendant) call button or actuator, and they may optionally include controls for the room environment, such as light, window shades, and/or room temperature.

The pillow speaker is commonly coupled to the infotainment display by a cable. The number of wires in the cable may vary among different infotainment displays depending, for example, on the manufacturer of the display, and the number and types of control features offered. The cables generally do not include dedicated power lines, but they commonly supply limited power levels combined with other signals, for example, data control signals. To avoid use of an additional power source, the pillow speaker is limited to a low power consumption level. Increasing interactive capabilities are generally desired without increased power consumption.

The signaling protocol for controlling the display may vary among displays. Furthermore, the user interface on the pillow speaker may vary with the capabilities of the display and with the abilities of the user. The many combinations of display protocols, display capabilities, and user abilities may be difficult for a single manufacturer of pillow speakers to supply.

SUMMARY

According to one aspect, the present disclosure relates to a hand-held control device for controlling an A-V display and ancillary functions in a room, wherein the device comprises a housing which includes a first housing piece and a second housing piece, and a touch pad with a plurality of touch-sensitive control buttons attached to an exterior surface of the first housing piece. In accordance with this aspect, the second housing piece defines a coupler well containing an electrical header electrically connected to the control buttons. A speaker retention structure on an interior surface of the second housing piece comprises an annular wall extending from an interior surface of the first housing piece, the annular wall including a plurality of gaps at spaced intervals, and a resilient speaker retention finger extending from the interior surface of the first housing piece in each of the gaps. A cable connector assembly comprises a coupler containing a socket, and a control cable electrically connected to the socket within the coupler. The coupler is sized and shaped to fill the coupler well in the second housing piece so that the socket is connectable to the electrical header in the coupler well.

According to another aspect, the present disclosure relates to a hand-held control device for controlling an A-V display and ancillary functions in a room, wherein the control device comprises a housing comprising a first housing piece having an interior surface and an exterior surface and a second housing piece having an interior surface and an exterior surface. A touch pad including a plurality of control buttons is fixed to the exterior surface of the first housing piece. In accordance with this aspect, the control device further comprises a speaker retention structure configured to retain in the housing a speaker including a magnet and a speaker cone frame having a circumferential edge, the speaker retention structure comprising an annular support on the interior surface of the second housing piece configured to hold the speaker magnet and a support post positioned on the interior surface of the second housing piece so as to support the speaker cone frame. The speaker retention structure also comprises a retention ring on the interior surface of the first housing piece and comprising an annular wall with a plurality of gaps at spaced intervals, and a retention finger located in each of the gaps. Each of the retention fingers is positioned and configured to removably engage the circumferential edge of the speaker cone frame.

DETAILED DESCRIPTION

Figure 1:
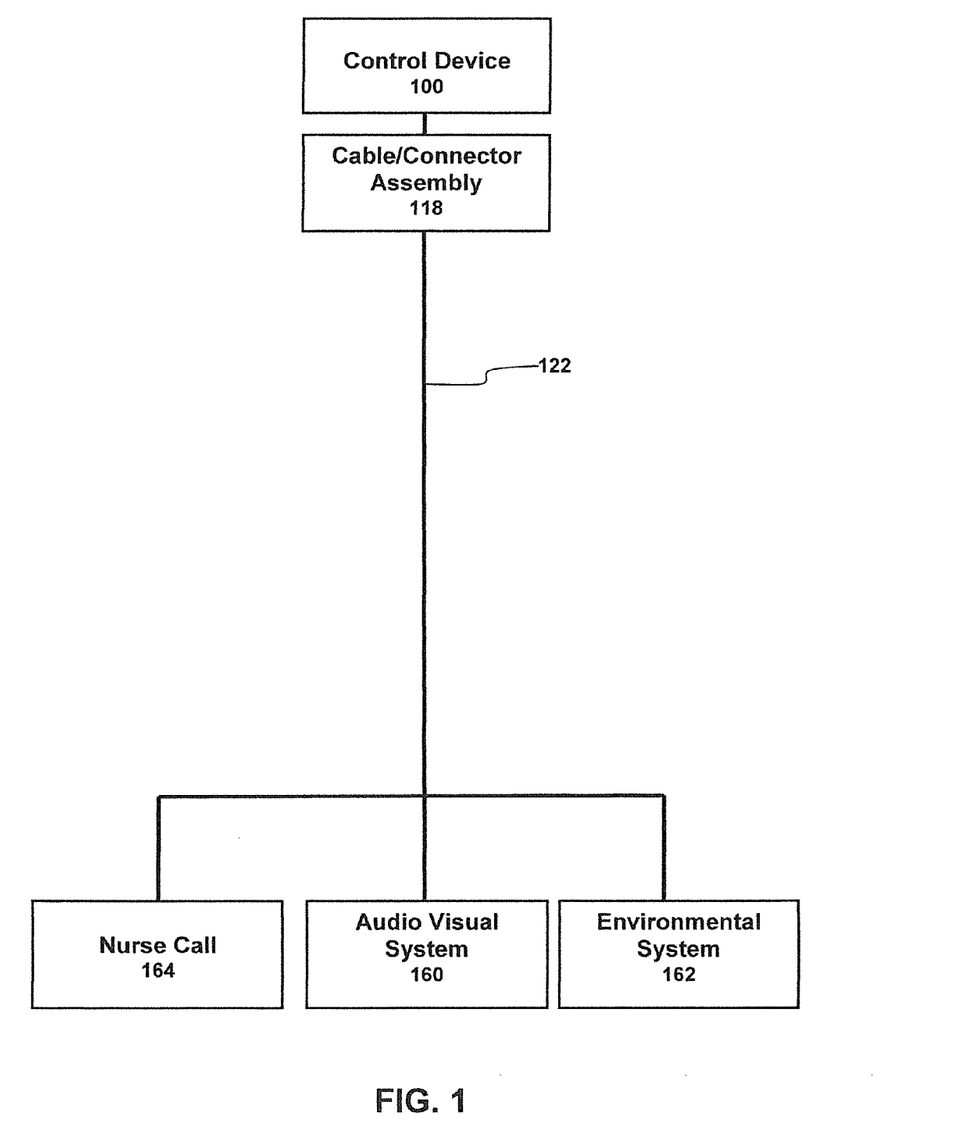
FIG. 1 is a diagrammatic representation of an audio-visual display system and auxiliary function system controlled by a patient room control device in accordance with the present disclosure.

FIG. 1 shows a schematic diagram of a modular handheld control device 100, which is connected, via a cable connector assembly 118, to a cable 122, which is in turn connected to an audio visual system 160. The control device 100 and the cable connector assembly 118 may be placed, at least in part, within a single housing, as is further described below. The control device 100 generates signals which are then passed through the cable connector assembly 118 and into the cable 122 to the audio visual (A-V) system 160, which may include servers, antennas, and various other devices for receiving, processing and distributing audio visual signals and receiving and processing control signals such as those generated by the control device 100. The cable 122 may also carry control signals from the control device 100 to room environmental systems 162 (e.g., lights, window shades, temperature controls). Likewise, a nurse call button (described below) on the control device may generate a nurse call signal on the cable 122 that is transmitted to a nurse call indicator 164 at a nurses' station.

Figure 2:
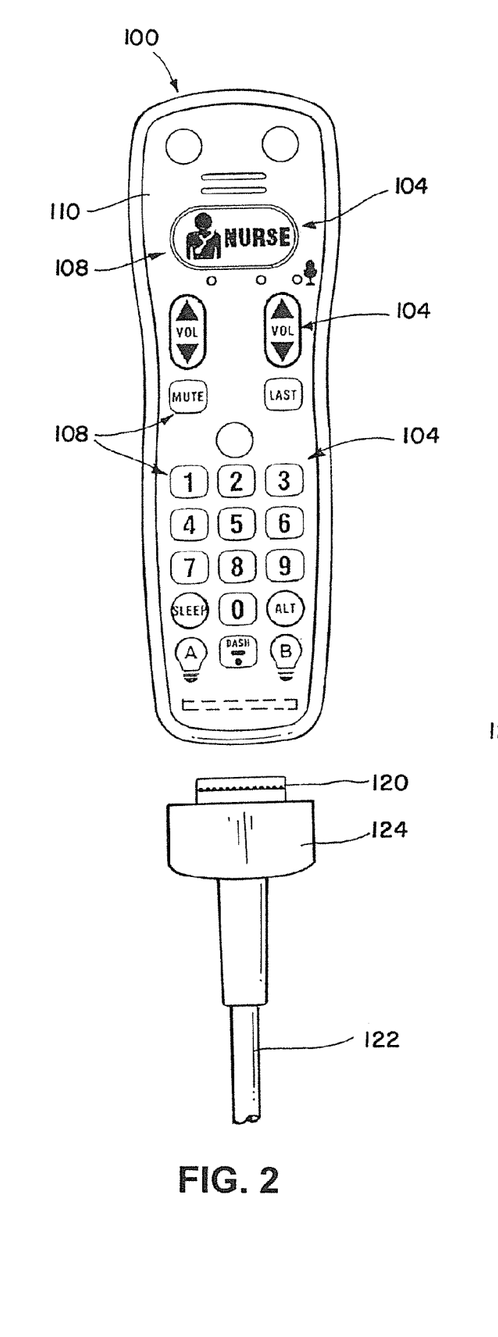
FIG. 2 is a top plan view of a patient room control device embodied as a pillow speaker, in accordance with an aspect of the present disclosure, showing the control device with its cable connector assembly disconnected.
Figure 3:
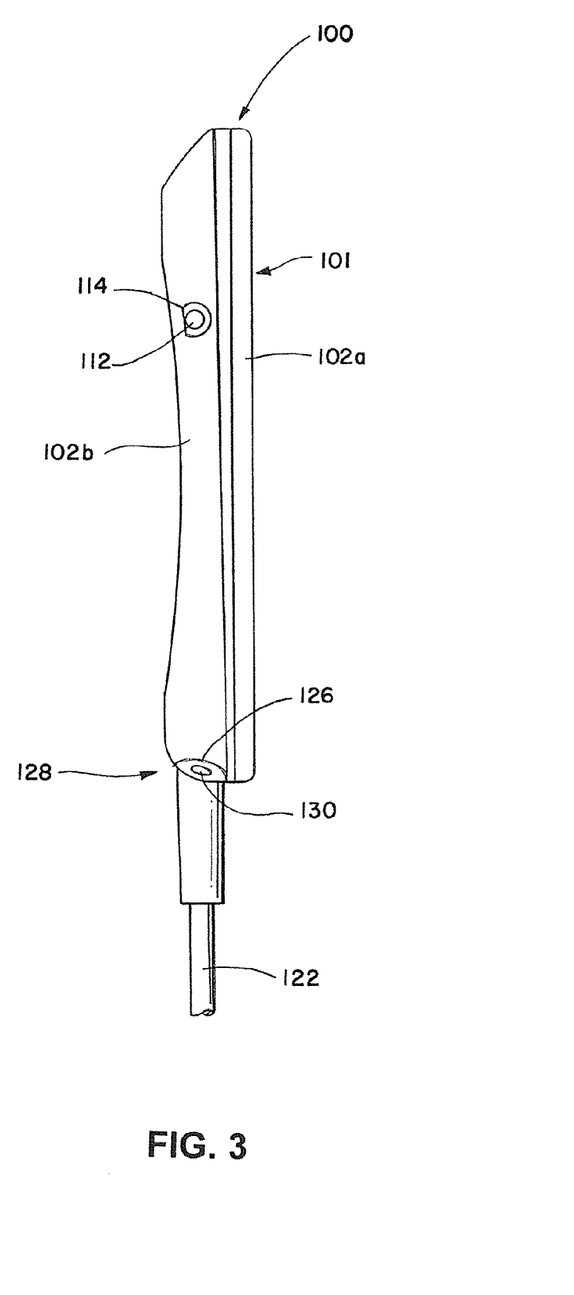
FIG. 3 is a side elevation view of the control device of FIG. 2, with the cable connector assembly attached.
Figure 4:
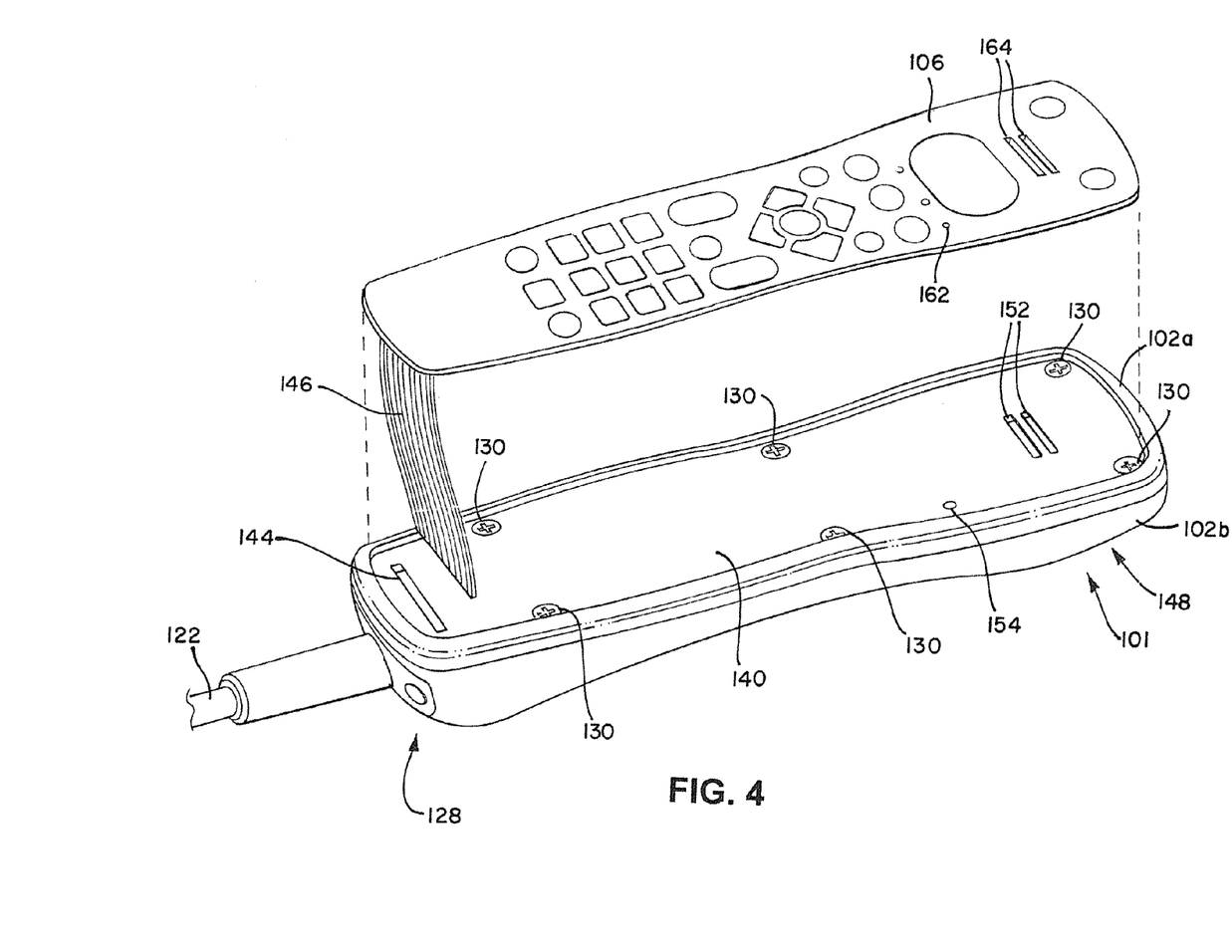
FIG. 4 is a partially exploded perspective view of the control device in accordance with aspects of the disclosure.

Referring now to FIG. 2, which is a top view of an audiovisual display control device 100 in accordance with aspects of the disclosure, and FIG. 3, which is a side view of the control device 100 of FIG. 2, the control device 100 includes a hand-held housing or enclosure 101, preferably comprising a front housing portion 102a removably attached to a rear housing portion 102b by a snap or friction fit, using, for example, a conventional tongue-and-groove arrangement. The attachment of the housing portions 102a, 102b may advantageously be reinforced by mechanical fasteners, such as screws 130 (FIG. 4). The housing 101 may advantageously be configured as a pillow speaker, in accordance with one or more embodiments of the disclosure. The housing 101 is advantageously self-sealing, making it fluid resistant. A touch pad 106 is installed on an exterior surface of the front housing portion 102a, as discussed below. The touch pad 106 is of a conventional type that includes an array of touch- or pressure-sensitive control buttons that are responsive to a user's finger pressure to sense inputs from the user. One such touch pad is disclosed in US Patent Application Publication No. 2013/0229583 A1, the disclosure of which is incorporated herein by reference in its entirety, and which is commonly assigned to the assignee of the present application. A front panel 110 of the touch pad 106 has markings 108 corresponding to the function of each of the control buttons. The control buttons 104 will typically include A-V control buttons 104 for the A-V system 160 (FIG. 1) in the user's room and a nurse call button 105. Advantageously, ancillary function buttons 107 may be provided to control one or more aspects of the room environment (e.g., window shades, thermostat, and/or room lighting). When the user presses one or more of the buttons 104, 105, 107 on the touch pad 106, the control device 100 signals a command associated with the selected button(s) 104, 105, 107.

The housing 101 further includes a headphone jack 112, an opening 114 for which is integrally formed in rear housing portion 102b. When a user plugs a headphone set (not shown) into the jack 112, the control device bypasses a speaker 150 (FIG. 8) and routes incoming audio signals to the headphone jack 112.

As explained with reference to FIG. 1, the control device 100 connects to the A-V system 160 through the cable connector assembly 118 and its associated cable 122. The cable connector assembly 118 is advantageously modular, allowing for the cable interface to be reconfigured quickly, while maintaining the use of the same handheld control device 100. The cable connector assembly 118 includes a socket 120 electrically connected to the cable. In one exemplary embodiment, the socket may be a 2×13 or 26 pin, dual-row IDC socket, although other socket configurations may be used, depending on the particular application. The socket 120 is fixed to a coupler 124 at one end of the cable 122, the opposite end of which connects to the A-V system 160 (FIG. 1), either directly or indirectly. The coupler 124 is formed in a size and shape such that it plugs into and fills a coupler well 126 provided on a first or bottom end 128 of the rear housing portion 102b. When the coupler 124 is plugged into the coupler well 126, the socket 120 is received by a mating electrical connection header 230 (FIG. 8), as described below, thereby electrically connecting the control device 100 to the A-V system via the cable 122. As shown in FIGS. 2 and 3, the exterior curvature of the coupler 124 matches the exterior curvature of the rear housing portion 102b, thereby forming a continuous, uninterrupted exterior surface therewith. The coupler 124 may also be mechanically attached to the rear housing portion 102b by removable fasteners, such as, for example, screws 130, although any of a variety of removable mechanical fasteners may be used, as would be deemed advantageous for a particular application. The interface between the coupler 124 and the rear housing portion may advantageously provide a seal that impedes the leakage of moisture into the interior of the coupler well 126.

As shown in FIG. 4, the touch pad 106 is fixed to an inset front surface 140 of the front housing portion 102a. Near a first or lower end 128 of the front housing portion 102a, a wiring slit 144 allows a ribbon cable 146 connected to the touch pad 106 to pass through the front housing portion 102a into the interior of the housing 101. Near a second or upper end 148 of the front housing portion 102a, one or more internal audio openings 152 allow sound from a speaker 150 (FIG. 8) inside the housing to pass through the front housing portion 102a. The internal audio opening(s) 152 align with corresponding external audio opening(s) 164 in the touch pad 106 to allow the sound to pass through the touch pad 106 to be heard by the user. Optionally, a microphone (not shown) may be provided in the housing to communicate (via the cable 122) with, for example, a nurses' station upon the activation of an appropriate button 104. If so, aligned microphone apertures 154, 162 may be provided in the front housing portion 102a and the touch pad 106, respectively.

Figures 5, 6:
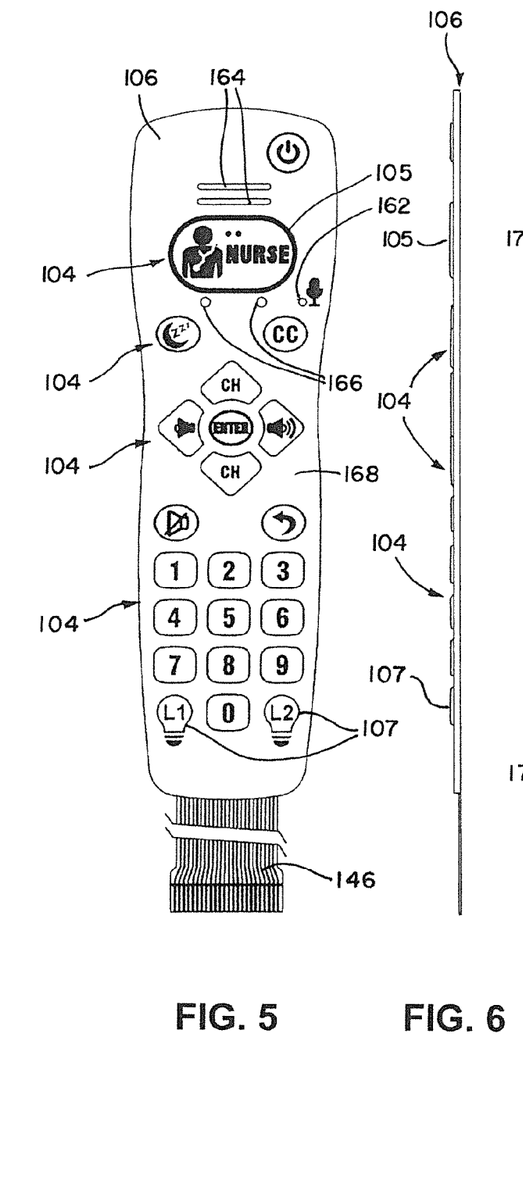
FIG. 5 is top plan view of the keypad of the control device and an attached ribbon cable.
FIG. 6 is a side elevation view of the keypad and ribbon cable of FIG. 4.
Figure 7:
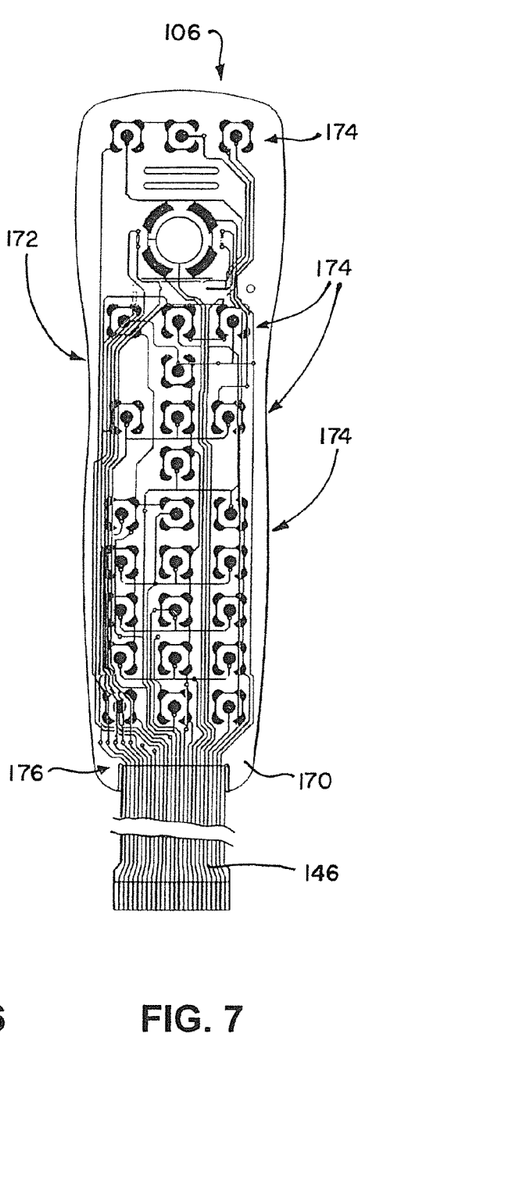
FIG. 7 is a bottom plan view of the keypad and wiring ribbon of FIG. 4, showing the circuit board on the back of the keypad with the ribbon cable attached.

The touch pad 106 is shown in more detail in FIGS. 5, 6, and 7. FIG. 5 shows a front surface 168 of the touch pad 106, including the external audio openings 164, the microphone aperture 162, and the control buttons 104 for the A-V system (e.g., on/off, channel selection, volume control, mute on/off, and others that may be appropriate for the particular application). One or more translucent apertures 166 may also be provided to allow light from illumination devices (e.g., LEDs, not shown) within the housing 101 to illuminate the touch pad 106, and, optionally, to offer visual confirmation to a user that the desired function has been initiated via the selected one(s) of the control buttons 104, 105, 107. The touch pad 106 has graphics printed on the front surface 168 which aid a user in determining the function of each of the buttons 104, 105, 107. The ribbon cable 146 is shown extending from an underside 170 of a first end 128 of the touch pad 106. FIG. 6 shows a side view of the touch pad 106, in which the raised surfaces of the buttons 104, 105, 107 (as provided in some embodiments to provide tactile feedback to the user) can be seen.

FIG. 7 shows a rear surface 170 of the touch pad 106, which includes a first printed circuit board 172 connecting signal-generating components 174 associated with the control buttons 104, 105, 107 to a first or input end 176 of the ribbon cable 146. Each of the buttons 104, 105, 107 is operatively connected to at least one corresponding signal-generating component 174, such as a pressure-sensitive switch or pressure-sensitive capacitive element, that will provide an electrical signal to the cable 146 in response to pressure applied to an associated one or more of the buttons 104, 105, 107, as is well known in the art. These signals are thus sent from the touch pad 106 to the ribbon cable 146 and ultimately to the cable connector assembly 118 (FIG. 2) and the attached cable 122 (FIG. 2). In this embodiment, terminal ends of the individual signal wires of the ribbon cable 146 are integral with or directly connected to (as by soldering) corresponding terminals of the first circuit board 172. In other embodiments, a header (not shown) may be formed on or connected to, the touch pad 106. A corresponding socket (not shown) provided on a first end 176 of the ribbon cable 146 would engage the header. It may be advantageous, in some embodiments, for the relative positions of the socket and header to be reversed.

Figure 8:
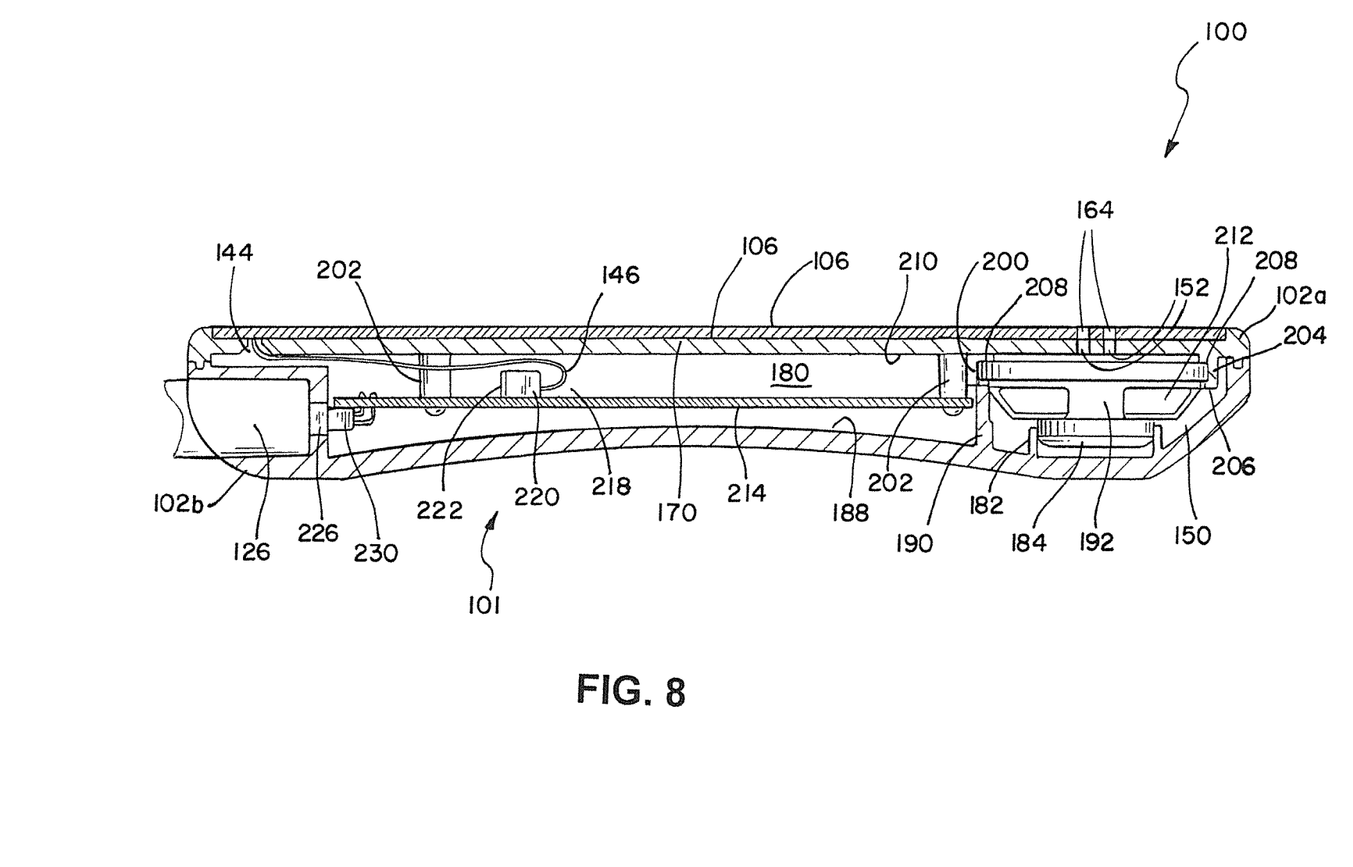
FIG. 8 is a cross sectional side view of the control device without the cable connector assembly.
Figure 9:
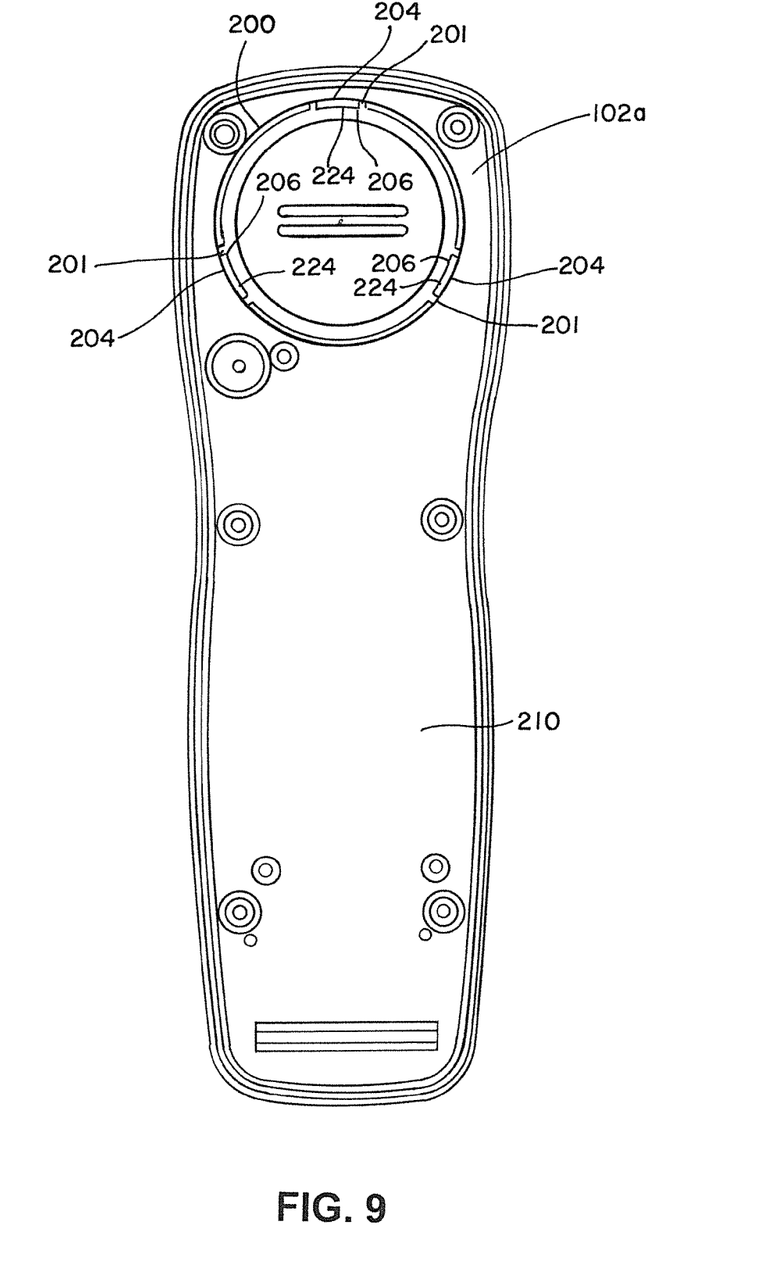
FIG. 9 is a plan view of the interior of the front housing portion of the control device in accordance with aspects of the disclosure.

FIGS. 8 and 9 show the interior structure of the housing portions 102a, 102b of the control device 100. The cross-section shown in FIG. 8 shows the touch pad 106 without the buttons for clarity. As noted previously, the touch pad 106 is inset in the front housing portion 102a, which is removably attached to the rear housing portion 102b, as described above. Together, the front housing portion 102a and the rear housing portion 102b define a housing interior 180.

FIGS. 8 and 9 show a speaker retention structure that includes an annular support 182 for a speaker magnet 184 formed on an interior surface 188 of the rear housing portion 102b, and a speaker cone frame retention ring 200 formed on an interior surface 210 of the front housing portion 102a, facing the annular support 182. A plurality of supports 190 (only one of which is shown) for a speaker cone frame 192 extend forward from the rear housing portion 102b toward the front housing portion 102a, such that the supports 190 contact the speaker cone frame 192 near its outer perimeter. The speaker retention ring 200 includes an annular wall interrupted by several gaps 201 at spaced intervals. In each of the gaps 201, one of a plurality of retention fingers 204 extends from the front housing portion 102a. Each finger 204 terminates in a hook 206 that extends a short distance radially inward. The hooks 206 engage the perimeter of the speaker cone basket 192, thereby holding the speaker 150 up against an annular shoulder 208 on the interior surface 210 of the front housing portion 102a. The annular shoulder 208 holds the speaker cone basket 192 away from the interior surface 210 of the front housing portion 102a, allowing a diaphragm or cone 212 of the speaker 150 room to vibrate to reproduce audible sound from an audio signal received via the cable 146. The sound can then travel out the internal audio openings 152 and through the external audio openings 164 so that it may be heard externally of the device.

The structure of the speaker retention ring 200 is more clearly shown in FIG. 9. In this plan view of the interior of the front housing portion, the speaker retention ring 200, provided on the interior surface 210 of the front housing portion 102a can be more clearly seen. The speaker retention ring 200 comprises an annular wall interrupted by several gaps 201 at spaced intervals. In each of the gaps 201, one of the plurality of retention fingers 204 extends from the front housing portion 102a. In this embodiment three fingers 204 are shown, but as few as one, or as many as four, five, eight or more are contemplated. The fingers 204 are curved along their circumferential length to match the overall circumference of the speaker retention ring 200. The hook 206 at the end of each finger 204 extends into an inner diameter of the speaker retention ring 200. As a speaker 150 (FIG. 8) is mounted during assembly, the speaker basket 192 contacts an upper surface 224 of each of the hooks 206. This upper surface 224 is angled downward inwardly toward the center of the speaker retention ring 200. Thus, the upper surface 224 of each hook 206 acts as a camming surface, causing the corresponding finger 204 to flex radially outward as force is applied to the upper surface 224 by the speaker cone basket 192 (FIG. 8). Once the outer edge of the basket 192 passes the tips of the hooks 206, the fingers 204 flex back inwardly, and the hooks 206 engage the perimeter of the speaker cone basket 192 as shown in FIG. 8, thereby engaging the speaker 150 against an annular shoulder 208 on the interior surface 210 of the front housing portion 102a.

The speaker retention structure shown in FIGS. 8 and 9 and described above provides secure retention of the speaker 150 within the housing 101, so that the speaker is not easily dislodged if the control device 100 is dropped, yet it does not interfere with or impede the acoustic vibration of the speaker cone. The speaker retention structure also allows the speaker to be easily removed and replaced if damaged.

Referring again to FIG. 8, a plurality of circuit board supports 202 extend from the front housing portion 102a into the interior 180 of the housing 101. A second circuit board 214 may be attached to the circuit board supports 202 (by means such as rivets or screws, not shown) and suspended in the interior 180 of the housing 101. The ribbon cable 146 extends from the underside 170 of the touch pad 106 through the ribbon cable slot 144 in the front housing portion 102a and into the housing interior 180. A second or output end 218 of the ribbon cable 146, opposite the inlet end attached to the touch pad 106, is fitted with an internal ribbon cable socket 220, which may be, for example, a conventional 26-pin socket. The internal cable socket 220 attaches to a corresponding pin header 222 (e.g., a conventional 26-pin header) on the second circuit board 214. The second circuit board 214 may advantageously include one or more printed circuits (not shown) that provide functionality associated with one or more of the buttons 104, 105, 107 (FIG. 5), as is well-known in the art.

The coupler well 126 in the rear housing portion 102b terminates in an interior wall 226 having an opening in which the above-mentioned coupler header 230 is installed. The coupler header 230 (e.g., a conventional 26-pin header) is electrically connected to terminals on the second circuit board 214, which, in turn, are electrically connected to the internal ribbon cable socket 220. As can be understood from FIGS. 2 and 8, the cable connector assembly 118, with its socket 120, interfaces with the coupler header 230. The interface of the coupler header 230 and the socket 120 provides power to the control device 100, and also passes signals to and from the device 100. Thus, should the coupler 124 and/or the cable 122 become non-functional, they may be replaced as a unit, and a new modular cable connector assembly 118 (a cable 122 and a coupler 124) may be connected to the existing controller device 100, reducing maintenance and replacement costs.

Although this disclosure has described various embodiments, it should be recognized that a number of variations and modifications of these embodiments may suggest themselves to those skilled in the pertinent arts. Thus, the specific embodiments disclosed herein are considered exemplary only, and not limiting.

What is claimed is:

1. A hand-held control device for controlling an A-V display and ancillary functions in a room, the control device comprising:
   a housing comprising a first housing piece having an interior surface and an exterior surface and a second housing piece having an interior surface and an exterior surface;
   a touch pad including a plurality of control buttons fixed to the exterior surface of the first housing piece; and
   a speaker retention structure configured to retain in the housing a speaker including a magnet and a speaker cone frame having a circumferential edge, the speaker retention structure comprising:

an annular support on the interior surface of the second housing piece and configured to hold the speaker magnet;

a support post positioned on the interior surface of the second housing piece so as to support the speaker cone frame;

a retention ring on the interior surface of the first housing piece and comprising an annular wall with a plurality of gaps at spaced intervals; and a resilient finger located in each of the gaps, each of the resilient fingers being positioned and configured to removably engage the circumferential edge of the speaker cone frame.

2. The control device of claim 1, wherein the second housing piece defines a coupler well container an electrical header electrically connected to the control buttons, the device further comprising:

a cable connector assembly comprising:

a coupler configured to removably plug into the well and having an exterior surface conforming to the exterior surface of the second housing piece;

a socket attached to the coupler so as to connect to the electrical connection header when the coupler is plugged into the well; and a cable having a first end joined to and entering the coupler and electrically connected within the coupler to the socket.

3. The control device of claim 1, wherein each of the resilient fingers terminates in a radially inward directed hook configured to removably engage the circumferential edge of the speaker cone frame.

4. The control device of claim 3, wherein each of the resilient fingers wherein each of the retention fingers includes a camming surface that causes the finger to flex radially outward in response to engagement by the speaker cone frame.

5. A hand-held control device for controlling an A-V display and ancillary functions in a room, the device comprising:

a housing comprising a first housing piece and a second housing piece, the second housing piece defining a coupler well;

a touch pad attached to an exterior surface of the first housing piece and including a plurality of touch-sensitive control buttons;

an electrical header located in the coupler well and electrically connected to the control buttons;

a speaker retention structure located on an interior surface of the second housing piece, and configured to removably hold a speaker; and a cable connector assembly comprising a coupler containing a socket, and a control cable attached to the coupler and electrically connected to the socket within the coupler;

wherein the coupler is configured to plug into and fill the coupler well in the second housing piece so that the socket is connectable to the electrical header in the coupler well.

6. The control device of claim 5, wherein the speaker retention structure comprises:

an annular wall extending from an interior surface of the first housing piece and including a plurality of gaps at spaced intervals; and a resilient finger extending from the interior surface of the first housing piece in each of the gaps.

7. The control device of claim 6, wherein each of the resilient fingers terminates in a radially inward directed hook configured to removably engage a circumferential edge of a speaker cone frame.

8. The control device of claim 7, wherein each of the resilient fingers terminates in a camming surface that causes the finger to flex radially outward in response to engagement by the speaker cone frame.

* * * * *